(12) United States Patent
Tsurube

(10) Patent No.: US 12,131,549 B2
(45) Date of Patent: Oct. 29, 2024

(54) IMAGE MONITORING DEVICE

(71) Applicant: Panasonic Intellectual Property Management Co., Ltd., Osaka (JP)

(72) Inventor: Tomoyuki Tsurube, Tokyo To (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 105 days.

(21) Appl. No.: 18/104,962

(22) Filed: Feb. 2, 2023

(65) Prior Publication Data

US 2023/0316768 A1  Oct. 5, 2023

(30) Foreign Application Priority Data

Mar. 29, 2022 (JP) ................................. 2022-054057

(51) Int. Cl.
*G06V 20/56* (2022.01)
*G06T 7/00* (2017.01)
*G06V 20/10* (2022.01)

(52) U.S. Cl.
CPC ............ *G06V 20/56* (2022.01); *G06T 7/0002* (2013.01); *G06V 20/10* (2022.01); *G06T 2207/30181* (2013.01); *G06T 2207/30252* (2013.01)

(58) Field of Classification Search
CPC . G06T 2207/30168; G06T 2207/30252; G06T 7/0002; G06T 7/0004; G06T 2207/30181; G06V 20/56; G06V 20/10
USPC .................................................. 348/143, 148
See application file for complete search history.

(56) References Cited

U.S. PATENT DOCUMENTS

| | | | |
|---|---|---|---|
| 10,791,252 B2 | 9/2020 | Tsurube et al. | |
| 2014/0010408 A1 | 1/2014 | Irie et al. | |
| 2014/0132769 A1* | 5/2014 | Kido ................... | G06V 20/584 |
| | | | 348/148 |
| 2020/0053354 A1 | 2/2020 | Tsurube | |

(Continued)

FOREIGN PATENT DOCUMENTS

| | | |
|---|---|---|
| JP | 2014-30188 | 2/2014 |
| JP | 2015-61163 | 3/2015 |
| JP | 2018-132861 | 8/2018 |

(Continued)

OTHER PUBLICATIONS

Notice of Allowance issued in Japan Patent Application No. 2022-54057, dated Oct. 31, 2023, together with English translation thereof.

*Primary Examiner* — Sherrie Hsia
(74) *Attorney, Agent, or Firm* — Greenblum & Bernstein, P.L.C.

(57) ABSTRACT

An image monitoring device includes a hardware processor. An image of the outside of a vehicle is captured by a camera. The hardware processor notifies that dirt adheres to a lens of the camera when a ratio of a smooth region in the image is more than a threshold. In the smooth region, differences in luminance value between pixels are small. The hardware processor does not notify that dirt adheres to the lens of the camera when: a ratio of the smooth region in a sky region in the image is more than a threshold, a ratio of the smooth region in a ground region in the image is more than a threshold, and a difference between an average of luminance values of the smooth region in the sky region and an average of luminance values of the smooth region in the ground region is more than a threshold.

8 Claims, 8 Drawing Sheets

(56) References Cited

U.S. PATENT DOCUMENTS

2023/0316482 A1* 10/2023 Tsurube .................... B60R 1/20
                                                          348/148

FOREIGN PATENT DOCUMENTS

| JP | 6731645      | 7/2020 |
| WO | 2018/150661  | 8/2018 |
| WO | 2019/026513  | 2/2019 |

* cited by examiner

IMAGE MONITORING DEVICE

CROSS-REFERENCE TO RELATED APPLICATIONS

This application is based upon and claims the benefit of priority from Japanese Patent Application No. 2022-054057, filed on Mar. 29, 2022, the entire contents of which are incorporated herein by reference.

FIELD

The present disclosure relates generally to an image monitoring device.

BACKGROUND

Conventionally, a vehicle has executed various types of processing suitable for a surrounding environment of the vehicle that has been recognized on the basis of an image captured by an in-vehicle camera. In a case where a lens of the in-vehicle camera is dirty, the vehicle is not able to recognize the surrounding environment of the vehicle. Considering this issue, a technique of determining whether or not dirt adheres to a lens of an in-vehicle camera on the basis of an image captured by the in-vehicle camera has been known (for example, JP 6731645 B2). Such a technique determines whether or not dirt adheres to a lens on the basis of the number of blocks whose luminance values are smooth (or monotonous), namely, on the basis of a width of a region where luminance values are smooth (or monotonous), which are/is included in an image captured by the in-vehicle camera.

However, even if dirt does not adhere to a lens, a region with a smooth luminance value is sometimes formed in an image captured by an in-vehicle camera. In this case, an image monitoring device sometimes falsely detects that dirt adheres to a lens.

SUMMARY

An image monitoring device according to the present disclosure includes a hardware processor connected to a memory. The hardware processor is configured to acquire an image of an outside of a vehicle captured by a camera. The hardware processor is configured to make a notification that dirt adheres to a lens of the camera in a case where a ratio of a smooth region in the image is equal to or larger than a threshold. The smooth region is a region in which differences in luminance value between pixels are small. The hardware processor is configured to make no notification that dirt adheres to the lens of the camera in a case where: a ratio of the smooth region in a sky region is equal to or larger than a threshold, the sky region being a region of a sky included in the image, a ratio of the smooth region in a ground region is equal to or larger than a threshold, the ground region being a region of a ground surface included in the image, and a difference between an average of luminance values of the smooth region in the sky region and an average of luminance values of the smooth region in the ground region is equal to or larger than a threshold.

DETAILED DESCRIPTION

Hereinafter, an embodiment of an image monitoring device according to the present disclosure will be described with reference to the drawings.

First Embodiment

Figure 1:
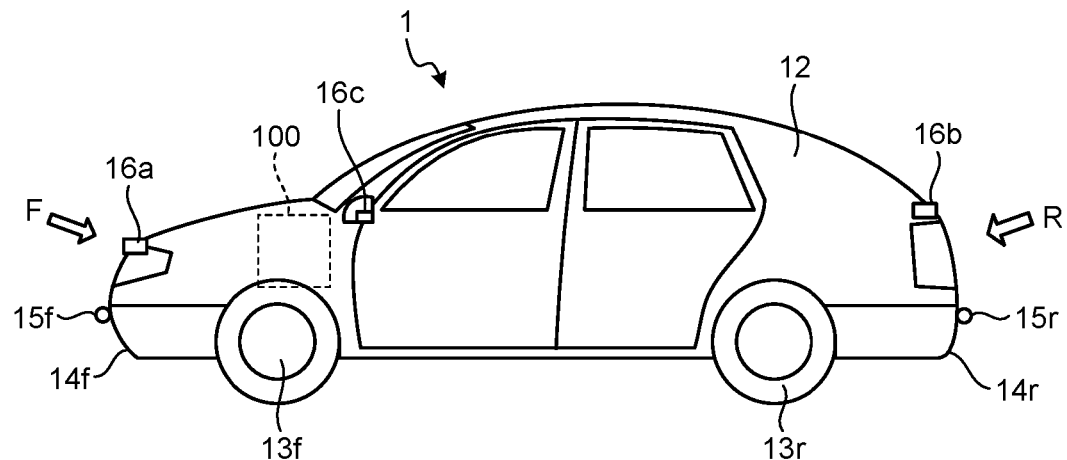
FIG. 1 is a diagram illustrating an example of a vehicle including an in-vehicle device according to a first embodiment.

FIG. 1 is a diagram illustrating an example of a vehicle 1 including an in-vehicle device 100 according to a first embodiment. As illustrated in FIG. 1, the vehicle 1 includes a vehicle body 12, and two pairs of wheels 13 arranged on the vehicle body 12 in a predetermined direction. The two pairs of wheels 13 include a pair of front tires 13$f$ and a pair of rear tires 13$r$.

Note that the vehicle 1 illustrated in FIG. 1 includes four wheels 13, whereas the number of wheels 13 is not limited to this configuration. For example, the vehicle 1 may be a two-wheeled vehicle.

The vehicle body 12 is coupled to the wheels 13 and can move by the wheels 13. In this case, the predetermined direction that the two pairs of wheels 13 are arranged is the same as a traveling direction of the vehicle 1. The vehicle 1 can move forward or backward by the switching of gears (not illustrated) or the like. In addition, the vehicle 1 can also turn right or left by steerage.

In addition, the vehicle body 12 includes a front end portion F being an end portion on the front tire 13$f$ side, and a rear end portion R being an end portion on the rear tire 13$r$ side. The vehicle body 12 has an approximately-rectangular shape in a top view, and each of four corner portions of the approximately-rectangular shape is sometimes called an end portion. In addition, the vehicle 1 includes a display device, a speaker, and an operation unit, which are not illustrated in FIG. 1.

A pair of bumpers 14 are provided near the lower ends of the vehicle body 12 at the front and rear end portions F and R of the vehicle body 12. A front bumper 14$f$ out of the pair of bumpers 14 covers the entire front surface and a part of a side surface near a lower end portion of the vehicle body 12. A rear bumper 14$r$ out of the pair of bumpers 14 covers the entire rear surface and a part of a side surface near a lower end portion of the vehicle body 12.

Wave transmission/receiving units 15f and 15r that perform transmission/reception of sound waves such as ultrasound waves are arranged at predetermined end portions of the vehicle body 12. For example, one or more wave transmission/receiving units 15f are disposed on the front bumpers 14f, and one or more wave transmission/receiving units 15r are disposed on the rear bumper 14r. Hereinafter, in a case where distinction between the transmission/receiving units 15f and 15r is not specifically required, the transmission/receiving units 15f and 15r will be simply referred to as wave transmission/receiving units 15 In addition, the number and positions of the wave transmission/receiving units 15 are not limited to those in the example illustrated in FIG. 1. For example, the vehicle 1 may include the wave transmission/receiving units 15 on the left and right lateral sides.

In the present embodiment, sonars that use ultrasound waves are employed as an example of the wave transmission/receiving units 15, but the wave transmission/receiving units 15 may be radars that transmit and receive electromagnetic waves. Alternatively, the vehicle 1 may include both of a sonar and a radar. In addition, the wave transmission/receiving units 15 may be simply referred to as sensors.

The wave transmission/receiving units 15 detect a surrounding obstacle of the vehicle 1 on the basis of a transmission/receiving result of sound waves or electromagnetic waves. In addition, the wave transmission/receiving units 15 measure a distance between the vehicle 1 and a surrounding obstacle of the vehicle 1 on the basis of a transmission/receiving result of sound waves or electromagnetic waves.

In addition, the vehicle 1 is provided with a first in-vehicle camera 16a that captures an image of a front side of the vehicle 1, a second in-vehicle camera 16b that captures an image of a rear side of the vehicle 1, a third in-vehicle camera 16c that captures an image of a left lateral side of the vehicle 1, and a fourth in-vehicle camera that captures an image of a right lateral side of the vehicle 1. The illustration of the fourth in-vehicle camera is omitted in the drawings.

Hereinafter, in a case where distinction among the first in-vehicle camera 16a, the second in-vehicle camera 16b, the third in-vehicle camera 16c, and the fourth in-vehicle camera is not specifically required, the in-vehicle cameras will be simply referred to as in-vehicle cameras 16. The positions and the number of in-vehicle cameras 16 are not limited to those in the example illustrated in FIG. 1. For example, the vehicle 1 may include only two in-vehicle cameras corresponding to the first in-vehicle camera 16a and the second in-vehicle camera 16b. Alternatively, the vehicle 1 may further include another in-vehicle camera aside from the above-described in-vehicle cameras.

The in-vehicle camera 16 is a camera that is capable of capturing a video of the periphery of the vehicle 1 and capturing a color image, for example. Note that data of images captured by the in-vehicle camera 16 may include moving images, or may include still images. In addition, the in-vehicle camera 16 may be a camera built in the vehicle 1, or may be a camera such as a drive recorder that is retrofitted to the vehicle 1.

In addition, the vehicle 1 is provided with the in-vehicle device 100. The in-vehicle device 100 is an information processing device installable on the vehicle 1. The in-vehicle device 100 is an electronic control unit (ECU) or an on board unit (OBU), which is provided inside the vehicle 1, for example. Alternatively, the in-vehicle device 100 may be an external device installed near a dashboard of the vehicle 1. Note that the in-vehicle device 100 may also serve as a car navigation device or the like.

Figure 2:
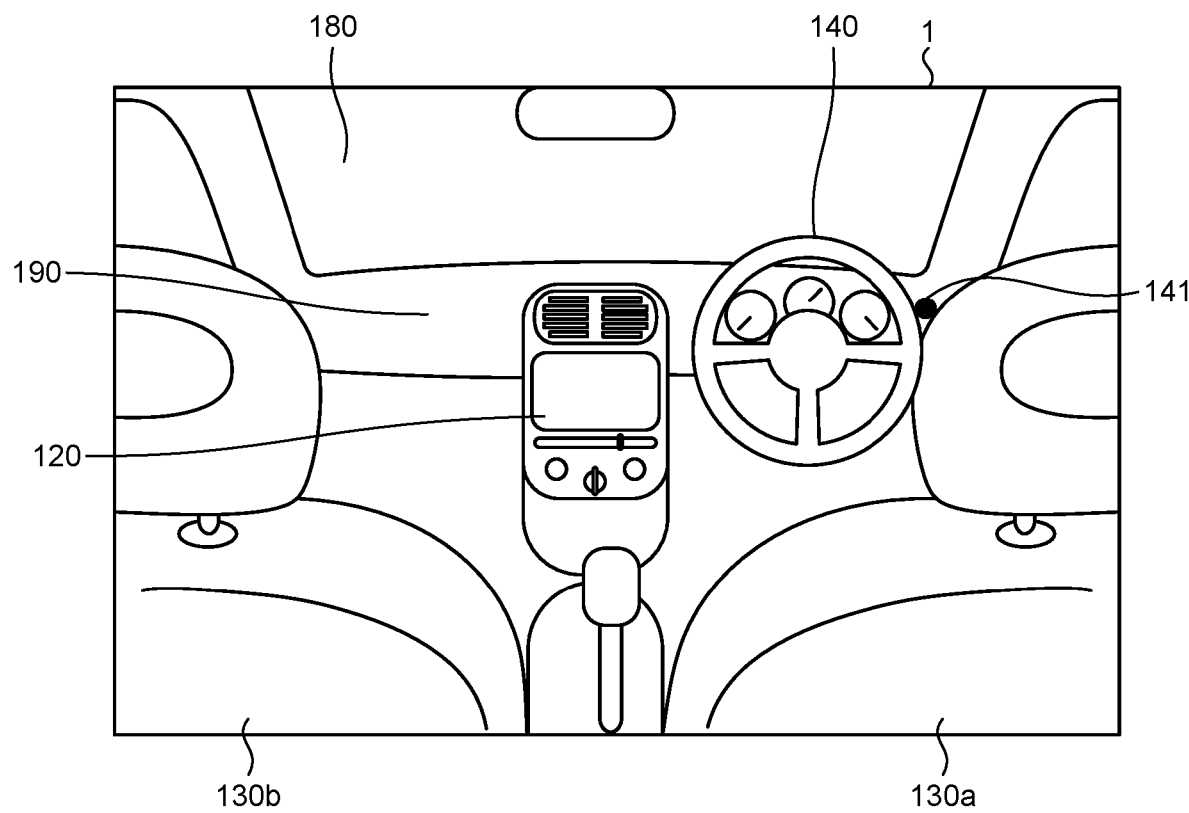
FIG. 2 is a diagram illustrating an example of a configuration in the vicinity of a driving seat of the vehicle according to the first embodiment.

Next, a configuration in the vicinity of a driving seat of the vehicle 1 according to the present embodiment will be described. FIG. 2 is a diagram illustrating an example of a configuration in the vicinity of a driving seat 130a of the vehicle 1 according to the first embodiment.

As illustrated in FIG. 2, the vehicle 1 includes the driving seat 130a and a front passenger seat 130b. In addition, a front glass 180, a dashboard 190, a steering wheel 140, a display device 120, and an operation button 141 are provided on the front side of the driving seat 130a.

The display device 120 is a display that is provided on the dashboard 190 of the vehicle 1. As one example, the display device 120 is positioned at the center of the dashboard 190 as illustrated in FIG. 2. The display device 120 is, for example, a liquid crystal display or an organic electro luminescence (EL) display. In addition, the display device 120 may also serve as a touch panel. The display device 120 is an example of a display unit in the present embodiment.

In addition, the steering wheel 140 is provided in front of the driving seat 130a, and is operable by a driver (operator). A rotational angle of the steering wheel 140 (i.e., steering angle) electrically or mechanically interlocks with a change in the orientation of the front tire 13f being a steerage wheel. Note that the steerage wheel may be the rear tire 13r, or both of the front tire 13f and the rear tire 13r may function as steerage wheels. The operation button 141 is a button that can receive an operation performed by a user. Note that, in the present embodiment, the user is an operator of the vehicle 1, for example. Note that the position of the operation button 141 is not limited to that in the example illustrated in FIG. 2, and may be provided on the steering wheel 140, for example. The operation button 141 is an example of an operation unit in the present embodiment. In addition, in a case where the display device 120 also serves as a touch panel, the display device 120 may serve as an example of an operation unit. In addition, an operation terminal (not illustrated) that can transmit a signal to the vehicle 1 from the outside of the vehicle 1, such as a tablet terminal, a smartphone, a remote controller, or an electronic key, may serve as an example of an operation unit.

Figure 3:
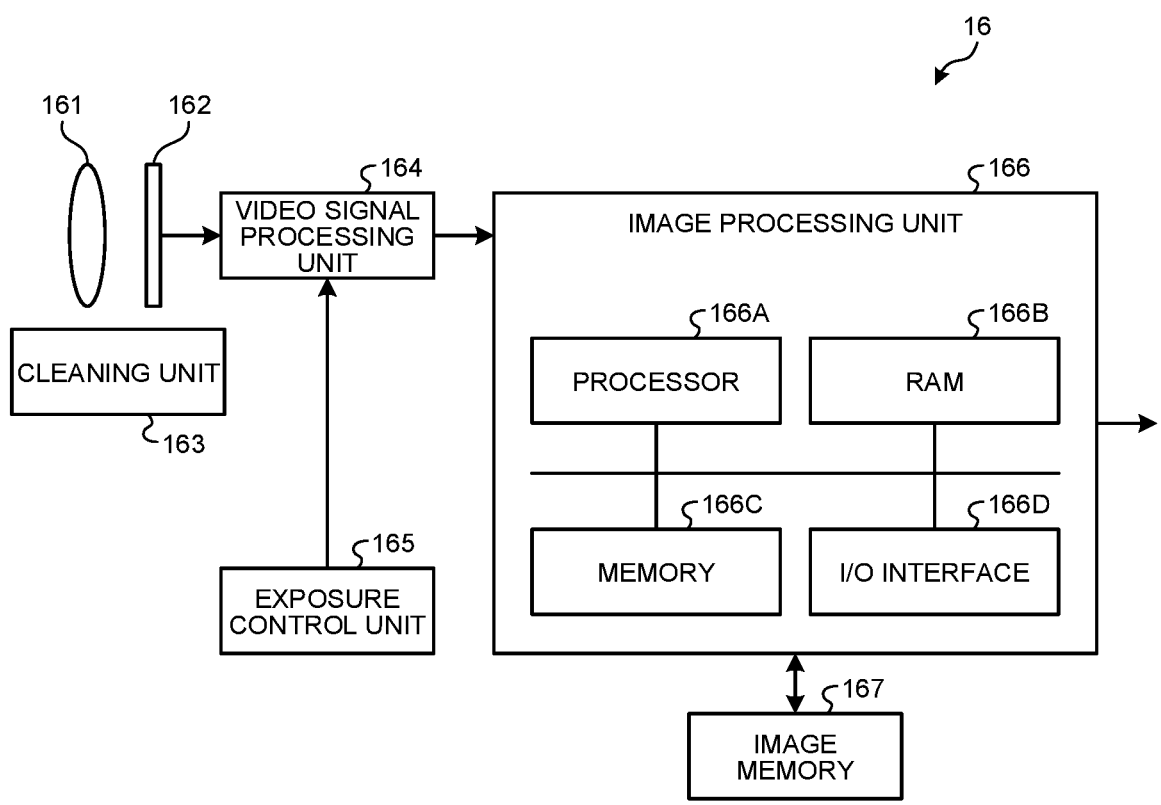
FIG. 3 is a diagram illustrating an example of a hardware configuration of the in-vehicle camera according to the first embodiment.

Next, a hardware configuration of the in-vehicle camera 16 according to the present embodiment will be described. FIG. 3 is a diagram illustrating an example of a hardware configuration of the in-vehicle camera 16 according to the first embodiment. As illustrated in FIG. 3, the in-vehicle camera 16 includes a lens 161, an image sensor 162, a cleaning unit 163, a video signal processing unit 164, an exposure control unit 165, an image processing unit 166, and an image memory 167.

The lens 161 is formed of transparent material. Then, the lens 161 diffuses or converges incident light.

The image sensor 162 is an image sensor such as a complementary metal-oxide semiconductor (CMOS) sensor or a charge coupled device (CCD) sensor. The image sensor 162 receives light having passed through the lens 161 and converts the light into a video signal.

The cleaning unit 163 is a device that cleans off dirt adhering to the lens 161 by jetting water or the like to the lens 161.

The video signal processing unit 164 generates an image on the basis of a video signal output from the image sensor 162. The exposure control unit 165 controls the brightness of the image generated by the video signal processing unit 164. In other words, the video signal processing unit 164 generates an image with brightness controlled by the exposure control unit 165. For example, in a case where an image is dark, the exposure control unit 165 increases the brightness of the image. On the other hand, in a case where an image is bright, the exposure control unit 165 decreases the brightness of the image. The image processing unit 166 executes various types of image processing on an image generated by the video signal processing unit 164. The image memory 167 is a main memory device of the image processing unit 166. The image memory 167 is used as a working memory of image processing to be executed by the image processing unit 166.

The image processing unit 166 may be implemented by a computer. The image processing unit 166 controls image processing by collaboration between hardware and software. The image processing unit 166 includes, for example, a processor 166A, a random access memory (RAM) 166B, a memory 166C, and an input/output (I/O) interface 166D.

The processor 166A is, for example, a central processing unit (CPU) that is capable of executing a computer program. Note that the processor 166A is not limited to a CPU. The processor 166A may be, for example, a digital signal processor (DSP), or may be another processor.

The RAM 166B is a volatile memory to be used as a cache or a buffer. The memory 166C is a non-volatile memory that stores various types of information including computer programs. The processor 166A implements various functions by reading specific computer programs from the memory 166C and loading the computer programs onto the RAM 166B.

The I/O interface 166D controls input/output of the image processing unit 166. For example, the I/O interface 166D executes communication with the video signal processing unit 164, the image memory 167, and the in-vehicle device 100.

Note that the cleaning unit 163 may be an independent device without being formed integrally with the in-vehicle camera 16. In addition, installation positions of the image processing unit 166 and the image memory 167 are not limited to positions inside the in-vehicle camera 16. The image processing unit 166 and the image memory 167 may be provided in the in-vehicle device 100, may be independent devices, or may be embedded in another device.

Next, functions included in the image processing unit 166 according to the first embodiment will be described.

Figure 4:
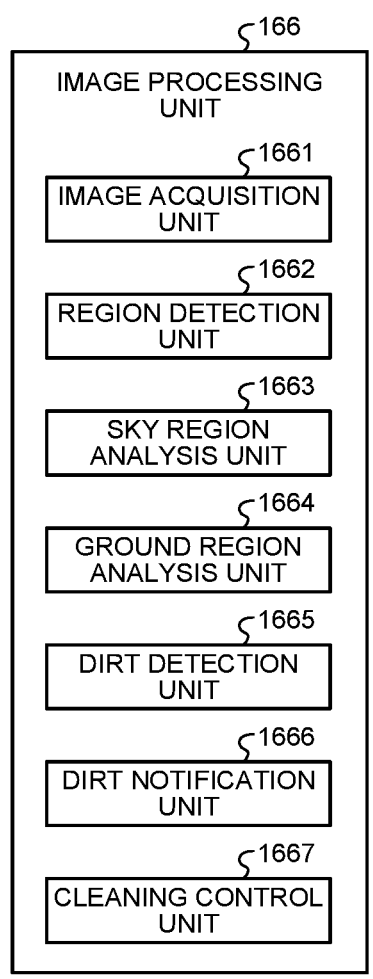
FIG. 4 is a block diagram illustrating an example of a functional configuration of an image processing unit according to the first embodiment.

FIG. 4 is a block diagram illustrating an example of a functional configuration of the image processing unit 166 according to the first embodiment. The processor 166A of the image processing unit 166 implements various functions by reading specific computer programs from the memory 166C, and loading the computer programs onto the RAM 166B. More specifically, the image processing unit 166 includes an image acquisition unit 1661, a region detection unit 1662, a sky region analysis unit 1663, a ground region analysis unit 1664, a dirt detection unit 1665, a dirt notification unit 1666, and a cleaning control unit 1667.

The image acquisition unit 1661 acquires an image of an outside of the vehicle 1 that has been captured by the in-vehicle camera 16. The image acquisition unit 1661 is an example of an acquisition unit. More specifically, the image acquisition unit 1661 acquires an image from the video signal processing unit 164. The image acquisition unit 1661 acquires, for example, a daytime captured image G1*a* captured in the daytime. In addition, the image acquisition unit 1661 acquires a nighttime captured image G1*b* captured in the nighttime. Moreover, the image acquisition unit 1661 acquires a light source nighttime captured image G1*c* including a light source G124 (see FIG. 7) such as the moon or a street lamp.

Figure 5:
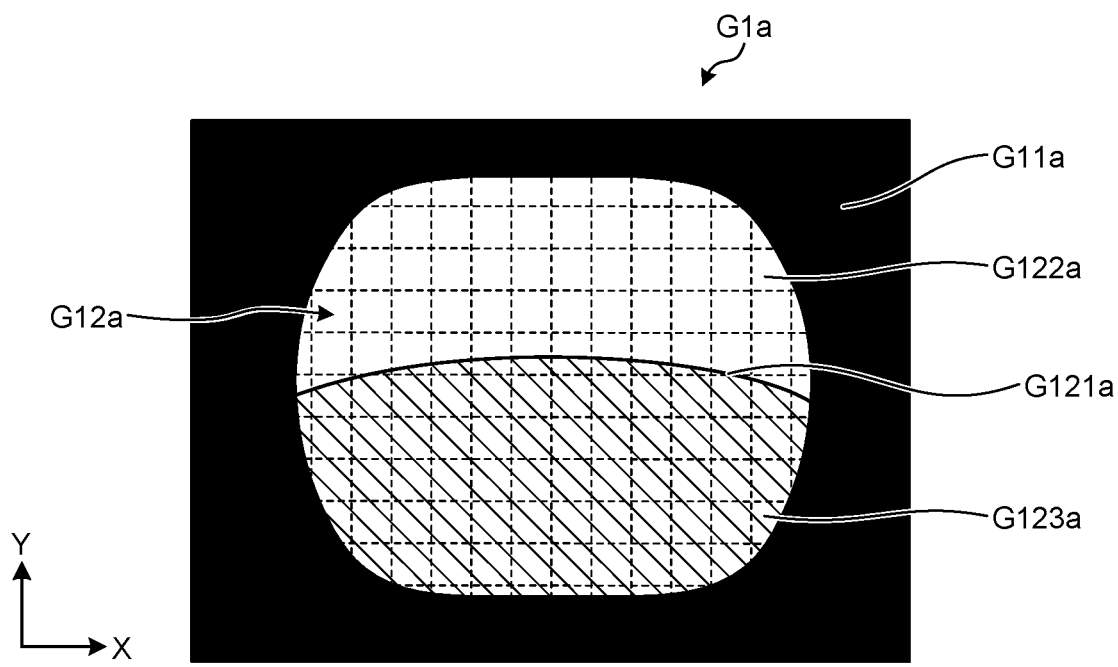
FIG. 5 is a diagram illustrating an example of a daytime captured image.

FIG. 5 is a diagram illustrating an example of the daytime captured image G1*a*. The daytime captured image G1*a* is an image captured in the daytime. As illustrated in FIG. 5, the daytime captured image G1*a* includes a non-image-captured region G11*a* and an image-captured region G12*a*. The non-image-captured region G11*a* is a detected region of the image sensor 162, and is a region where an image of an outside of the vehicle 1 is not captured due to a casing of the in-vehicle camera 16. The image-captured region G12*a* is a region where an image of an outside of the vehicle 1 has been captured by light that has entered via the lens 161.

The image-captured region G12*a* includes a horizon line G121*a*, a sky region G122*a*, and a ground region G123*a*. The horizon line G121*a* is a line indicating a boundary between a sky and a ground surface. The sky region G122*a* is a region of a sky in the daytime captured image G1*a*. The daytime captured image G1*a* has been captured in bright daytime, so that a luminance value of the sky region G122*a* is high. In addition, there is no object in the sky region G122*a* illustrated in FIG. 5. Thus, the sky region G122*a* is a region in which differences in luminance value between pixels are small and a variation in luminance values is smooth.

The ground region G123*a* is a region of a ground surface in the daytime captured image G1*a*. Here, the ground surface may be a road surface, may be a concrete pavement, may be a snow field, may be a sandy field, may be a grass field, or may be another surface. In a case where the ground surface is a road surface such as an asphalt road surface, a luminance value of the ground region G123*a* is low. In addition, there is no object in the ground region G123*a* illustrated in FIG. 5. Thus, the ground region G123*a* is a region in which differences in luminance value between pixels are small and a variation in luminance values is smooth.

Figure 6:
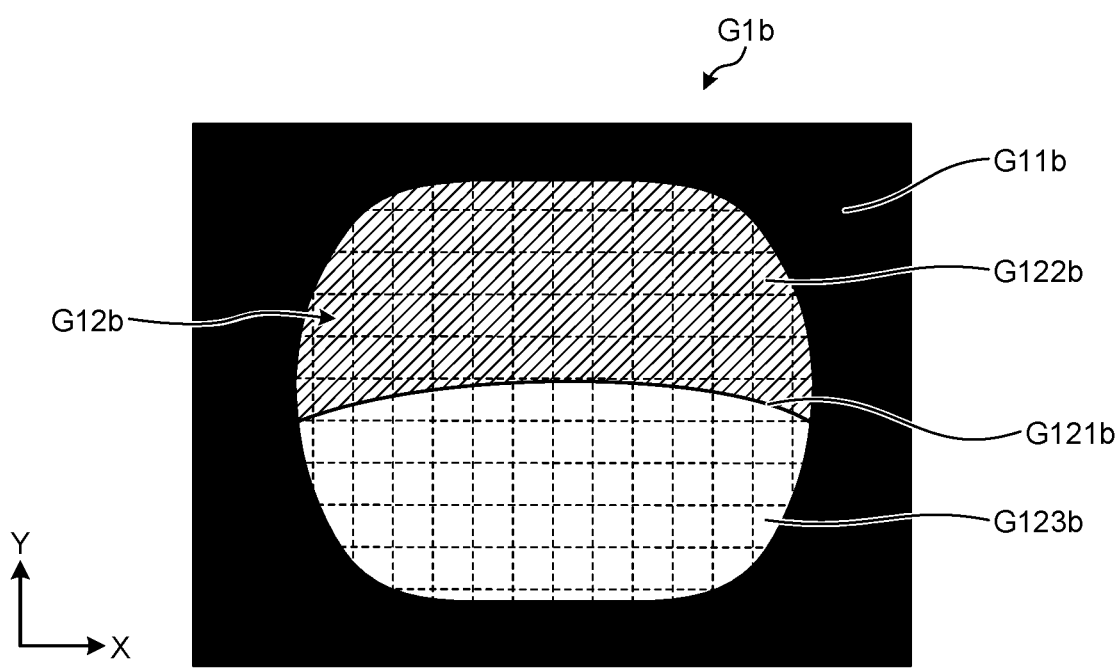
FIG. 6 is a diagram illustrating an example of a nighttime captured image.

FIG. 6 is a diagram illustrating an example of the nighttime captured image G1*b*. The nighttime captured image G1*b* is an image captured in the nighttime. As illustrated in FIG. 6, the nighttime captured image G1*b* includes a non-image-captured region G1ib and an image-captured region G12*b*. The image-captured region G12*b* includes a horizon line G121*b*, a sky region G122*b*, and a ground region G123*b*.

The nighttime captured image G1*b* has been captured in dark nighttime, so that a luminance value of the sky region G122*b* is low. In addition, there is no object in the sky region G122*b* illustrated in FIG. 6. Thus, the sky region G122*b* is a region in which differences in luminance value between pixels are small and a variation in luminance values is smooth. In a case where a ground surface is a snow field, the ground surface reflects moonlight or light from a street lamp or the like, so that a luminance value of the ground region G123*b* is high. In addition, there is no object in the ground region G123*b* illustrated in FIG. 6. Thus, the ground region G123*b* is a region in which differences in luminance value between pixels are small and a variation in luminance values is smooth.

Figure 7:
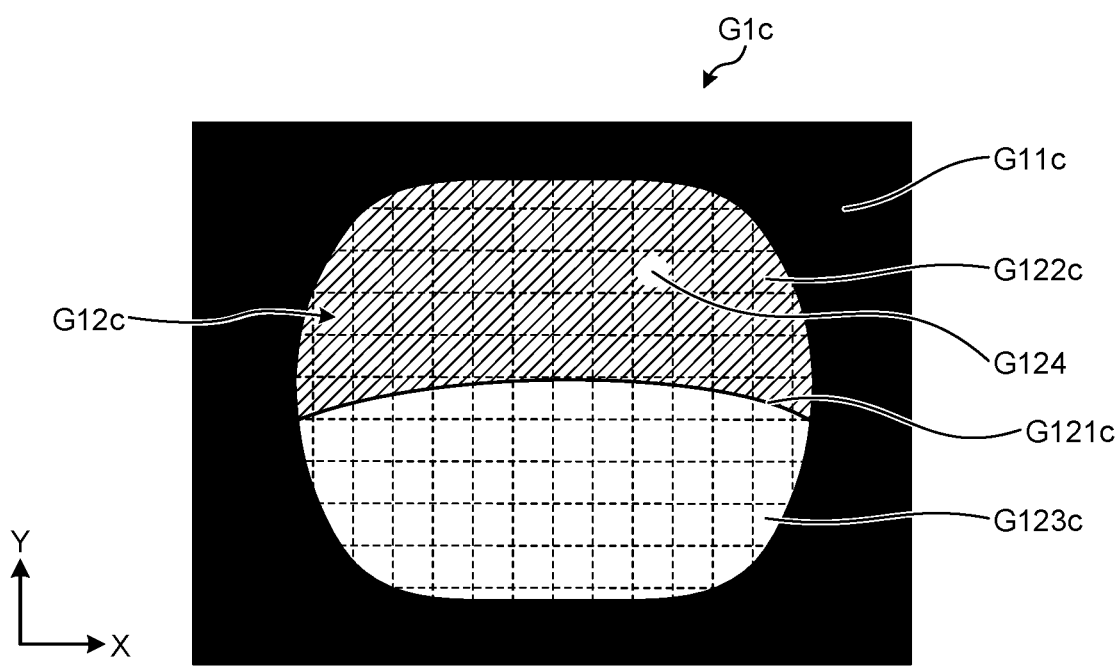
FIG. 7 is a diagram illustrating an example of a light source nighttime captured image.

FIG. 7 is a diagram illustrating an example of the light source nighttime captured image G1*c*. The light source nighttime captured image G1*c* is an image that has been captured in the nighttime. The light source nighttime captured image G1*c* includes the light source G124 such as the moon or a street lamp in a sky region G122*c*. As illustrated in FIG. 7, the light source nighttime captured image G1*c* includes a non-image-captured region G11c and an image-captured region G12c. The image-captured region G12c includes a horizon line G121c, the sky region G122c, and a ground region G123c.

The light source nighttime captured image G1c has been captured in dark nighttime, so that a luminance value of the sky region G122c is low. In addition, the sky region G122c illustrated in FIG. 7 includes the light source G124, so that a luminance value of a portion surrounding the light source G124 is high. In other words, the sky region G122c illustrated in FIG. 7 is a region in which differences in luminance value between pixels are small and a variation in luminance values is smooth, excluding the light source G124 and a portion surrounding the light source G124. On the other hand, the sky region G122c other than the light source G124 and a portion surrounding the light source G124 is a region in which a variation in luminance values is small, namely, a region where luminance values are smooth (or monotonous). In addition, there is no object in the ground region G123c illustrated in FIG. 7. Thus, the ground region G123c is a region in which differences in luminance value between pixels are small and a variation in luminance values is smooth.

Note that, in a case where no distinction among the daytime captured image G1a, the nighttime captured image G1b, and the light source nighttime captured image G1c is required, these captured images will be referred to as captured images G1. In a case where no distinction among the horizon line G121a of the daytime captured image G1a, the horizon line G121b of the nighttime captured image G1b, and the horizon line G121c of the light source nighttime captured image G1c is required, these horizon lines will be referred to as horizon lines G121. In a case where no distinction among the sky region G122a of the daytime captured image G1a, the sky region G122b of the nighttime captured image G1b, and the sky region G122c of the light source nighttime captured image G1c is required, these sky regions will be referred to as sky regions G122. In a case where no distinction among the ground region G123a of the daytime captured image G1a, the ground region G123b of the nighttime captured image G1b, and the ground region G123c of the light source nighttime captured image G1c is required, these ground regions will be referred to as ground regions G123.

The region detection unit 1662 detects various regions from the captured image G1 acquired by the image acquisition unit 1661. In other words, the region detection unit 1662 detects the sky region G122 and the ground region G123 from the captured image G1 acquired by the image acquisition unit 1661.

More specifically, the region detection unit 1662 detects the horizon line G121 from the captured image G1. Then, the region detection unit 1662 detects the sky region G122 and the ground region G123 on the basis of the horizon line G121 included in the captured image G1 captured by the in-vehicle camera 16. The region detection unit 1662 is an example of a detection unit. The region detection unit 1662 detects, as the sky region G122, a region of the captured image G1 that is located on the upper side of the horizon line G121. In addition, the region detection unit 1662 detects, as the ground region G123, a region of the captured image G1 that is located on the lower side of the horizon line G121.

The horizon line G121 is formed at a position corresponding to an angle of the in-vehicle camera 16 with respect to a horizontal direction. For example, in a case where the in-vehicle camera 16 is oriented upward with respect to the horizontal direction, the horizon line G121 is arranged on the lower side of the center of the captured image G1. On the other hand, in a case where the in-vehicle camera 16 is oriented downward with respect to the horizontal direction, the horizon line G121 is arranged on the upper side of the center of the captured image G1. Accordingly, the region detection unit 1662 detects the horizon line G121 on the basis of an angle of the in-vehicle camera 16 with respect to the horizontal direction.

A position of the horizon line G121 in a captured image may be predefined by varying an installation condition of the in-vehicle camera 16. Similarly, by varying an installation condition of the in-vehicle camera 16, positions of the sky region G122 and the ground region G123 in a captured image may be predefined. In other words, the region detection unit 1662 needs not detect the horizon line G121, the sky region G122, and the ground region G123.

The sky region analysis unit 1663 analyzes the sky region G122. More specifically, in a case where the sky region G122 is detected by the region detection unit 1662, the sky region analysis unit 1663 analyzes the sky region G122 for each of the blocks demarcated by dotted lines, which are illustrated in FIGS. 5, 6, and 7.

The sky region analysis unit 1663 counts the number of blocks included in the sky region G122. In addition, the sky region analysis unit 1663 counts the number of blocks while excluding the light source G124 such as the moon or a street lamp as in the light source nighttime captured image G1c illustrated in FIG. 7, or the like. In other words, in the case of the nighttime captured image G1b, the sky region analysis unit 1663 counts the number of blocks on the condition that a luminance value of a block is smaller than a first threshold. Here, the number of blocks is used in processing to be described later. Then, although the light source G124 such as the moon or a street lamp is not dirt, the light source G124 is excluded from an analysis target because an error is generated if the light source G124 is included in the analysis target. Note that the sky region analysis unit 1663 may determine whether a captured image is the nighttime captured image G1b on the basis of a time. The sky region analysis unit 1663 may perform the determination on the basis of a detection result of a sensor that detects brightness of the outside of the vehicle 1, or may perform the determination by another method.

The sky region analysis unit 1663 counts the number of smooth blocks in the sky region G122, which are blocks with smooth luminance values. In a case where the sky region G122 of the captured image G1 is divided into a plurality of blocks, a smooth block in the sky region G122 refers to a block in which differences in luminance value between pixels are smaller than a second threshold. More specifically, the smooth block in the sky region G122 refers to a block in which a difference between a largest luminance value and a smallest luminance value in the block is smaller than the second threshold. In a case where the sky region G122 is detected by the region detection unit 1662, the sky region analysis unit 1663 determines whether or not a block is a smooth block in the sky region G122, for each of the blocks demarcated by dotted lines, which are illustrated in FIGS. 5, 6, and 7. Then, the sky region analysis unit 1663 counts the number of smooth blocks in the sky region G122.

In addition, the sky region analysis unit 1663 calculates a smooth block rate of the sky region G122. Specifically, the sky region analysis unit 1663 calculates a ratio of a smooth block with respect to blocks included in the sky region G122.

In addition, the sky region analysis unit 1663 calculates, for each block, an average luminance value being an average of luminance values of pixels in a corresponding block.

Moreover, the sky region analysis unit 1663 calculates an average of luminance values of the respective blocks in the sky region G122. In other words, the sky region analysis unit 1663 calculates an average of luminance values of the blocks in the sky region G122 by dividing the total value of average luminance values of the respective blocks in the sky region G122 by the number of blocks in the sky region G122. Note that an average of luminance values of the blocks in the sky region G122 is not limited to an average of average luminance values of the respective blocks, and may be an average of largest luminance values of the respective blocks, may be an average of smallest luminance values of the respective blocks, or may be an average of other luminance values.

The ground region analysis unit 1664 analyzes the ground region G123. More specifically, in a case where the ground region G123 is detected by the region detection unit 1662, the ground region analysis unit 1664 analyzes the ground region G123 for each of the blocks demarcated by dotted lines, which are illustrated in FIGS. 5, 6, and 7.

The ground region analysis unit 1664 counts the number of smooth blocks in the ground region G123, which are blocks with smooth luminance values. In a case where the ground region G123 of the captured image G1 is divided into a plurality of blocks, a smooth block in the ground region G123 refers to a block in which differences in luminance value between pixels in the block are smaller than a third threshold. In other words, the smooth block in the ground region G123 refers to a block in which a difference between a largest luminance value and a smallest luminance value in the block is smaller than the third threshold. In a case where the ground region G123 is detected by the region detection unit 1662, the ground region analysis unit 1664 determines whether or not each block is a smooth block in the ground region G123. Then, the ground region analysis unit 1664 counts the number of smooth blocks in the ground region G123.

In addition, the ground region analysis unit 1664 calculates a smooth block rate of the ground region G123. In other words, the ground region analysis unit 1664 calculates a ratio of a smooth block in the ground region G123 with respect to blocks included in the ground region G123.

In addition, the ground region analysis unit 1664 calculates, for each block, an average luminance value being an average of luminance values of pixels in a corresponding block.

Moreover, the ground region analysis unit 1664 calculates an average of luminance values of the respective blocks in the ground region G123. In other words, the ground region analysis unit 1664 calculates an average of luminance values of the blocks in the ground region G123 by dividing the total value of average luminance values of the respective blocks in the ground region G123 by the number of blocks in the ground region G123. Note that an average of luminance values of the blocks in the ground region G123 is not limited to an average of average luminance values of the respective blocks, and may be an average of largest luminance values of the respective blocks, may be an average of smallest luminance values of the respective blocks, or may be an average of other luminance values.

The dirt detection unit 1665 detects dirt adhering to the in-vehicle camera 16 on the basis of the captured image G1 captured by the in-vehicle camera 16.

In a case where dirt such as mud adheres to the lens 161 of the in-vehicle camera 16, the image sensor 162 becomes unable to receive visible light due to high-density dirt adhering to the lens 161. Thus, a luminance value of an image corresponding to a portion to which dirt adheres becomes low. In other words, an image corresponding to a portion to which dirt adheres becomes a smooth region being a region in which differences in luminance value between pixels are small. Accordingly, the dirt detection unit 1665 determines whether or not dirt adheres on the basis of a ratio of a smooth region included in the captured image G1.

More specifically, as illustrated in FIGS. 5, 6, and 7, the sky region G122 and the ground region G123 each become a smooth region in which differences in luminance value between pixels are small. Accordingly, the dirt detection unit 1665 determines whether or not a smooth block rate of the sky region G122 that has been calculated by the sky region analysis unit 1663 is equal to or larger than a fourth threshold. In addition, the dirt detection unit 1665 determines whether or not a smooth block rate of the ground region G123 that has been calculated by the ground region analysis unit 1664 is equal to or larger than a fifth threshold.

In addition, as illustrated in FIG. 5, in a case where the sky region G122 corresponds to a clear sky and the ground region G123 corresponds to asphalt, a difference between a luminance value of the sky region G122 and a luminance value of the ground region G123 becomes large. Alternatively, as illustrated in FIGS. 6 and 7, in a case where the sky region G122 corresponds to a night sky and the ground region G123 corresponds to a snow field, a difference between a luminance value of the sky region G122 and a luminance value of the ground region G123 becomes large. Accordingly, in a case where a difference between an average luminance value of the sky region G122 and an average luminance value of the ground region G123 are equal to or larger than a sixth threshold, the dirt detection unit 1665 determines that dirt does not adhere.

In a case where dirt with high density and a large area adheres to the lens 161 of the in-vehicle camera 16, a large smooth region is widely formed in the captured image G1 due to the dirt. Accordingly, in a case where a ratio of a smooth region being a region in which differences in luminance value between pixels are small in the captured image G1 is equal to or larger than a threshold under a predetermined condition, the dirt detection unit 1665 determines that dirt adheres to the lens 161 of the in-vehicle camera 16. Specifically, in a case where a smooth block rate of the sky region G122 is smaller than the fourth threshold, or a smooth block rate of the ground region G123 is smaller than the fifth threshold, or a difference between an average luminance value of the sky region G122 and an average luminance value of the ground region G123 is smaller than the sixth threshold, if a smooth block rate of a combined region of the sky region G122 and the ground region G123 is equal to or larger than a seventh threshold, the dirt detection unit 1665 determines that dirt adheres to the lens 161.

In a case where a ratio of a smooth region being a region in which differences in luminance value between pixels are small in the captured image G1 captured by the in-vehicle camera 16 is equal to or larger than a threshold, the dirt notification unit 1666 notifies that dirt adheres to the lens 161 of the in-vehicle camera 16. The dirt notification unit 1666 is an example of a notification unit. In other words, in a case where it is determined by the dirt detection unit 1665 that dirt adheres to the lens 161 of the in-vehicle camera 16, the dirt notification unit 1666 notifies that dirt adheres to the lens 161 of the in-vehicle camera 16.

For example, the dirt notification unit 1666 notifies that dirt adheres to the lens 161 of the in-vehicle camera 16 by displaying the notification on the display device 120 or the like. Note that a notification method is not limited to the display device 120. The dirt notification unit 1666 may make a notification by voice, or make a notification by causing a light emitting diode (LED) to light up, or may make a notification by another method.

Even in a case where a ratio of a smooth region in which differences in luminance value between pixels are small in the captured image G1 is equal to or larger than a threshold, dirt does not adhere to the lens 161 of the in-vehicle camera 16 in some cases. In such cases, the dirt notification unit 1666 does not notify that dirt adheres to the lens 161 of the in-vehicle camera 16.

More specifically, in a case where a ratio of a smooth region in the sky region G122 being a region of a sky that is included in the captured image G1 is equal to or larger than a threshold, a ratio of a smooth region in the ground region G123 being a region of a ground surface that is included in the captured image G1 is equal to or larger than a threshold, and a difference between an average of luminance values of the smooth region in the sky region G122 and an average of luminance values of the smooth region in the ground region G123 is equal to or larger than a threshold, the dirt notification unit 1666 does not notify that dirt adheres to the lens 161 of the in-vehicle camera 16. That is, in a case where a smooth block rate of the sky region G122 is equal to or larger than the fourth threshold, a smooth block rate of the ground region G123 is equal to or larger than the fifth threshold, and a difference between an average luminance value of the sky region G122 and an average luminance value of the ground region G123 is equal to or larger than the sixth threshold, the dirt notification unit 1666 does not notify that dirt adheres to the lens 161.

In addition, in a case where a ratio of a smooth region in the sky region G122 is smaller than a threshold or a ratio of a smooth region in the ground region G123 is smaller than a threshold, and a ratio of a smooth region in a combined region of the sky region G122 and the ground region G123 is equal to or larger than a threshold, the dirt notification unit 1666 notifies that dirt adheres to the lens 161 of the in-vehicle camera 16. That is, in a case where a smooth block rate of the sky region G122 is smaller than the fourth threshold, or a smooth block rate of the ground region G123 is smaller than the fifth threshold, and a smooth block rate in a combined region of the sky region G122 and the ground region G123 is equal to or larger than the seventh threshold, the dirt notification unit 1666 notifies that dirt adheres to the lens 161.

In addition, in a case where a ratio of a smooth region in the sky region G122 is smaller than a threshold, or a ratio of a smooth region in the ground region G123 is smaller than a threshold, and a ratio of a luminance value smooth region in a combined region of the sky region G122 and the ground region G123 is smaller than a threshold, the dirt notification unit 1666 does not notify that dirt adheres to the lens 161. That is, in a case where a smooth block rate of the sky region G122 is smaller than the fourth threshold, or a smooth block rate of the ground region G123 is smaller than the fifth threshold, and a smooth block rate in a combined region of the sky region G122 and the ground region G123 is smaller than the seventh threshold, the dirt notification unit 1666 does not notify that dirt adheres to the lens 161.

In addition, in a case where a ratio of a smooth region in the sky region G122 excluding a region with a luminance value equal to or larger than a threshold is equal to or larger than a threshold, a ratio of a smooth region in the ground region G123 is equal to or larger than a threshold, and a difference between an average of luminance values of the smooth region in the sky region G122 and an average of luminance values of the smooth region in the ground region G123 is equal to or larger than a threshold, the dirt notification unit 1666 does not notify that dirt adheres to the lens 161 of the in-vehicle camera 16. That is, in a case where a smooth block rate of the sky region G122 excluding a region of the light source G124 such as the moon or a street lamp is equal to or larger than the fourth threshold, a smooth block rate of the ground region G123 is equal to or larger than the fifth threshold, and a difference between an average luminance value of the sky region G122 and an average luminance value of the ground region G123 is equal to or larger than the sixth threshold, the dirt notification unit 1666 does not notify that dirt adheres to the lens 161.

The cleaning control unit 1667 controls the cleaning unit 163 to clean the lens 161 of the in-vehicle camera 16. For example, in a case where the dirt detection unit 1665 detects that dirt adheres, the dirt notification unit 1666 displays, on the display device 120, a notification indicating that dirt adheres to the lens 161. An operator such as a driver accordingly inputs an operation of causing the cleaning unit 163 to execute cleaning, by using the operation button 141 or a touch panel included in the display device 120. Then, upon receiving the operation of causing the cleaning unit 163 to execute cleaning, the cleaning control unit 1667 causes the cleaning unit 163 to clean the lens 161.

Next, a flow of sky region analysis processing to be executed by the image processing unit 166 will be described.

Figure 8:
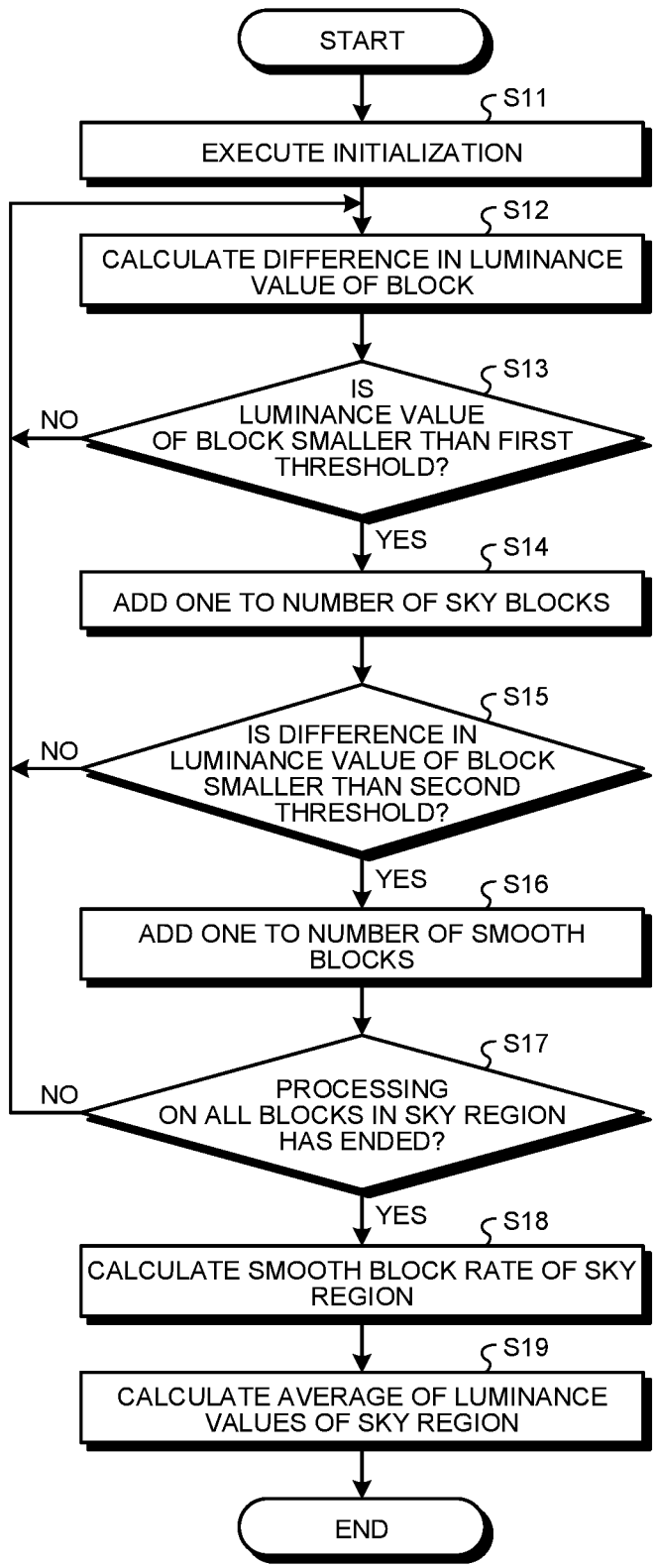
FIG. 8 is a flowchart illustrating an example of sky region analysis processing to be executed by the image processing unit according to the first embodiment.

FIG. 8 is a flowchart illustrating an example of sky region analysis processing to be executed by the image processing unit 166 according to the first embodiment. The image processing unit 166 analyzes the sky region G122 for each block of the sky region G122 in the sky region analysis processing. In addition, the image processing unit 166 executes the sky region analysis processing each time a certain period of time such as one second elapses.

The sky region analysis unit 1663 initializes variables to be used in analysis of the sky region G122 (Step S11).

The sky region analysis unit 1663 calculates a difference in luminance value of a processing target block in the sky region G122 (Step S12). That is, the sky region analysis unit 1663 subtracts a smallest luminance value from a largest luminance value in the processing target block.

In a case of the light source nighttime captured image G1c, the sky region analysis unit 1663 determines whether or not a luminance value of the processing target block in the sky region G122 is smaller than a first threshold (Step S13). The luminance value may be an average value in the block, may be a largest value in the block, may be a smallest value in the block, or may be another value in the block. That is, the sky region analysis unit 1663 determines whether or not the processing target block is a block including the light source G124 such as the moon or a street lamp. In addition, in the case of the light source nighttime captured image G1c, the image processing unit 166 executes processing in Step S13.

In a case where the luminance value is equal to or larger than the first threshold (Step S13; No), the sky region analysis unit 1663 shifts the processing to Step S12, and executes processing on another block.

In a case where the luminance value is smaller than the first threshold (Step S13; Yes), the sky region analysis unit 1663 adds one to the number of sky blocks indicating the number of blocks in the sky region G122 (Step S14).

The sky region analysis unit 1663 determines whether or not a value obtained by subtracting the smallest luminance value from the largest luminance value in the processing target block is smaller than a second threshold (Step S15). In other words, the sky region analysis unit 1663 determines whether or not the processing target block is a smooth block.

In a case where a value obtained by subtracting the smallest luminance value from the largest luminance value is equal to or larger than the second threshold (Step S15; No), the sky region analysis unit 1663 shifts the processing to Step S12, and executes processing on another block.

In a case where a value obtained by subtracting the smallest luminance value from the largest luminance value is smaller than the second threshold (Step S15; Yes), the sky region analysis unit 1663 adds one to the number of smooth blocks indicating the number of smooth blocks (Step S16).

The sky region analysis unit 1663 determines whether or not processing on all blocks in the sky region G122 has ended (Step S17). In a case where processing on all blocks has not ended (Step S17; No), the sky region analysis unit 1663 shifts the processing to Step S12, and executes processing on another block.

In a case where processing on all blocks has ended (Step S17; Yes), the sky region analysis unit 1663 calculates a smooth block rate indicating a ratio of a smooth block with respect to blocks in the sky region G122 (Step S18). In other words, the sky region analysis unit 1663 divides the number of smooth blocks by the number of sky blocks.

The sky region analysis unit 1663 calculates an average luminance value of the sky region G122 (Step S19). In other words, the sky region analysis unit 1663 adds up luminance values of the respective blocks in the sky region G122, and divides the obtained value by the number of sky blocks. Here, the luminance values of the respective blocks may be any of largest values, smallest values, and average values of the blocks.

In the above-described manner, the image processing unit 166 ends the sky region analysis processing.

Next, a flow of ground region analysis processing to be executed by the image processing unit 166 will be described.

Figure 9:
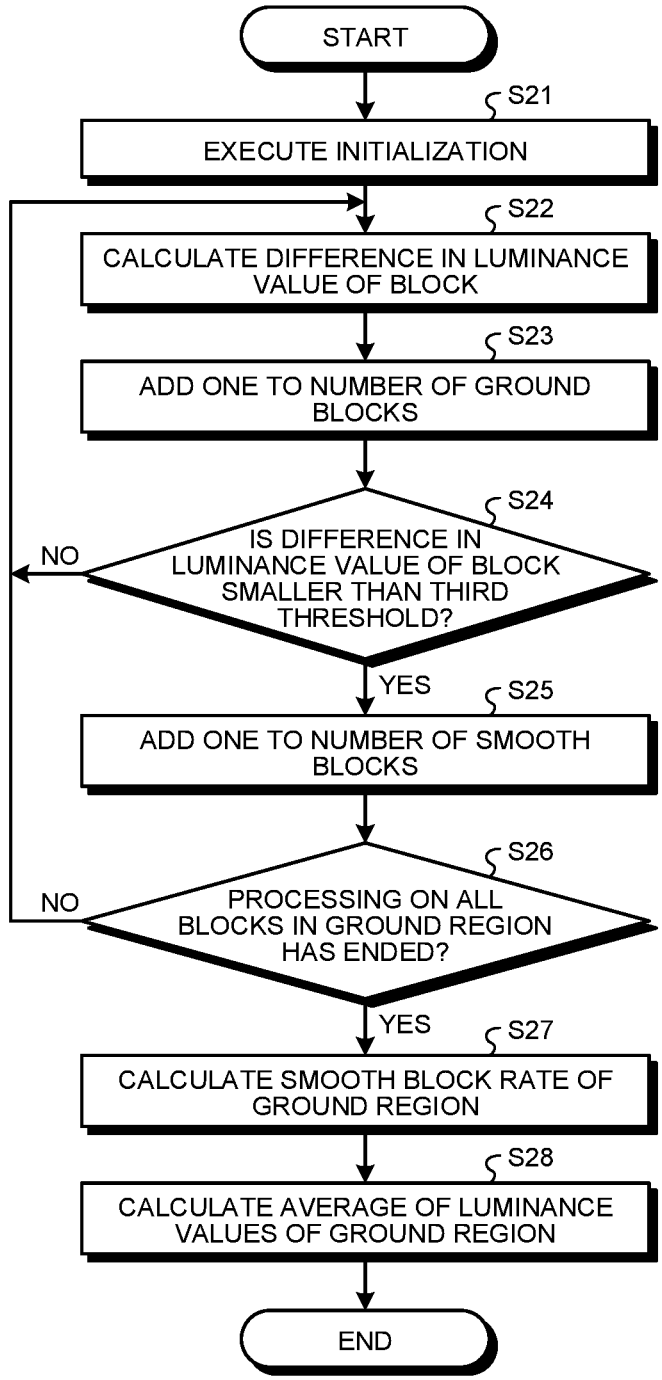
FIG. 9 is a flowchart illustrating an example of ground region analysis processing to be executed by the image processing unit according to the first embodiment.

FIG. 9 is a flowchart illustrating an example of ground region analysis processing to be executed by the image processing unit 166 according to the first embodiment. The ground region analysis unit 1664 analyzes the ground region G123 for each block of the ground region G123 in the ground region analysis processing. In addition, the image processing unit 166 executes the ground region analysis processing each time a certain period of time such as one second elapses.

The ground region analysis unit 1664 initializes variables to be used in analysis of the ground region G123 (Step S21).

The ground region analysis unit 1664 calculates a difference in luminance value of a processing target block in the ground region G123 (Step S22). That is, the ground region analysis unit 1664 subtracts a smallest luminance value from a largest luminance value in the processing target block.

The ground region analysis unit 1664 adds one to the number of ground blocks indicating the number of blocks in the ground region G123 (Step S23).

The ground region analysis unit 1664 determines whether or not a value obtained by subtracting the smallest luminance value from the largest luminance value in the processing target block is smaller than a third threshold (Step S24). In other words, the ground region analysis unit 1664 determines whether or not the processing target block is a smooth block.

In a case where a value obtained by subtracting the smallest luminance value from the largest luminance value is equal to or larger than the third threshold (Step S24; No), the ground region analysis unit 1664 shifts the processing to Step S22, and executes processing on another block.

In a case where a value obtained by subtracting the smallest luminance value from the largest luminance value is smaller than the third threshold (Step S24; Yes), the ground region analysis unit 1664 adds one to the number of smooth blocks indicating the number of smooth blocks (Step S25).

The ground region analysis unit 1664 determines whether or not processing on all blocks in the ground region G123 has ended (Step S26). In a case where processing on all blocks has not ended (Step S26; No), the ground region analysis unit 1664 shifts the processing to Step S22, and executes processing on another block.

In a case where processing on all blocks has ended (Step S26; Yes), the ground region analysis unit 1664 calculates a smooth block rate indicating a ratio of a smooth block with respect to blocks in the ground region G123 (Step S27). In other words, the ground region analysis unit 1664 divides the number of smooth blocks by the number of ground blocks.

The ground region analysis unit 1664 calculates an average luminance value of the ground region G123 (Step S28). In other words, the ground region analysis unit 1664 adds up luminance values of the respective blocks in the ground region G123, and divides the obtained value by the number of ground blocks. Here, the luminance values of the respective blocks may be any of largest values, smallest values, and average values of the blocks.

In the above-described manner, the image processing unit 166 ends the ground region analysis processing.

Next, a flow of dirt notification processing to be executed by the in-vehicle camera 16 will be described.

Figure 10:
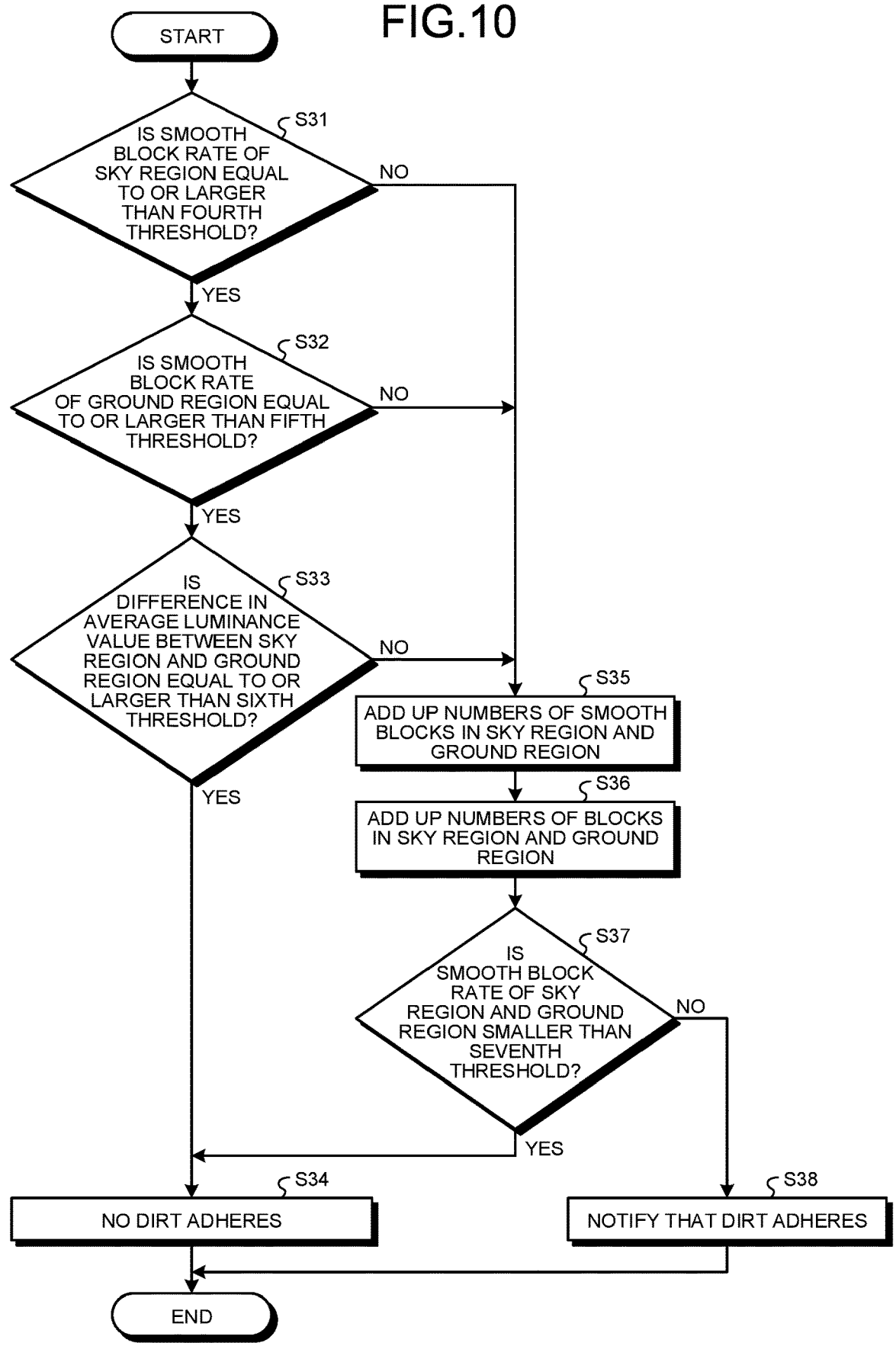
FIG. 10 is a flowchart illustrating an example of dirt notification processing to be executed by the image processing unit according to the first embodiment.

FIG. 10 is a flowchart illustrating an example of dirt notification processing to be executed by the image processing unit 166 according to the first embodiment. The image processing unit 166 executes the dirt notification processing each time the sky region analysis processing and the ground region analysis processing are executed.

The dirt detection unit 1665 determines whether or not a smooth block rate of the sky region G122 is equal to or larger than a fourth threshold (Step S31). In a case where a smooth block rate of the sky region G122 is smaller than the fourth threshold (Step S31; No), the dirt detection unit 1665 shifts the processing to Step S35.

In a case where a smooth block rate of the sky region G122 is equal to or larger than the fourth threshold (Step S31; Yes), the dirt detection unit 1665 determines whether or not a smooth block rate of the ground region G123 is equal to or larger than a fifth threshold (Step S32). In a case where a smooth block rate of the ground region G123 is smaller than the fifth threshold (Step S32; No), the dirt detection unit 1665 shifts the processing to Step S35.

In a case where a smooth block rate of the ground region G123 is equal to or larger than the fifth threshold (Step S32; Yes), the dirt detection unit 1665 determines whether or not a difference in average luminance value between the sky region G122 and the ground region G123 is equal to or larger than a sixth threshold (Step S33). In a case where a difference in average luminance value is smaller than the sixth threshold (Step S33; No), the dirt detection unit 1665 shifts the processing to Step S35.

In a case where a difference in average luminance value is equal to or larger than the sixth threshold (Step S33; Yes), the dirt detection unit 1665 determines that dirt does not adhere to the lens 161 of the in-vehicle camera 16 (Step S34). In addition, the dirt notification unit 1666 determines not to make a notification.

The dirt detection unit 1665 calculates a total value of the numbers of smooth blocks by adding up the number of smooth blocks in the sky region G122 and the number of smooth blocks in the ground region G123 (Step S35).

The dirt detection unit 1665 calculates a total value of the numbers of blocks by adding up the number of sky blocks being the number of blocks in the sky region G122, and the number of ground blocks being the number of blocks in the ground region G123 (Step S36).

The dirt detection unit 1665 determines whether or not a smooth block rate of a combined region of the sky region G122 and the ground region G123 is smaller than a seventh threshold (Step S37). In other words, the dirt detection unit 1665 calculates the smooth block rate by dividing the total value of the numbers of smooth blocks by the total value of the numbers of blocks. Then, the dirt detection unit 1665 determines whether or not the calculated smooth block rate is smaller than the seventh threshold.

In a case where the smooth block rate is smaller than the seventh threshold (Step S37; Yes), the dirt detection unit 1665 shifts the processing to Step S34.

In a case where the smooth block rate is equal to or larger than the seventh threshold (Step S37; No), the dirt notification unit 1666 notifies that dirt adheres to the lens 161 of the in-vehicle camera 16 (Step S38).

In the above-described manner, the image processing unit 166 ends the dirt notification processing.

As described above, the image processing unit 166 according to the first embodiment acquires the captured image G1 of the outside of the vehicle 1 that has been captured by the in-vehicle camera 16. In a case where a ratio of a smooth region in which differences in luminance value between pixels are small in the captured image G1 is equal to or larger than a threshold, the image processing unit 166 notifies that dirt adheres to the lens 161 of the in-vehicle camera 16. In a case where a ratio of a smooth region in the sky region G122 is equal to or larger than a threshold, a ratio of a smooth region in the ground region G123 is equal to or larger than a threshold, and a difference between an average of luminance values of the sky region G122 and an average of luminance values of the ground region G123 is equal to or larger than a threshold, the image processing unit 166 does not notify that dirt adheres to the lens 161 of the in-vehicle camera 16.

In other words, in a case where a ratio of a smooth region in the sky region G122 is equal to or larger than a threshold, a ratio of a smooth region in the ground region G123 is equal to or larger than a threshold, and a difference in average luminance value between the sky region G122 and the ground region G123 is equal to or larger than a threshold, the image processing unit 166 determines that no dirt adheres and makes no notification. The image processing unit 166 can accordingly prevent false detection of a state in which dirt adheres to the lens 161 of the in-vehicle camera 16.

The processing of the flowchart in FIG. 10 is an example. The determination in S33 and subsequent steps can be made after starting the flowchart without executing the processing in S31 and S32. In the first embodiment, this can be executed by setting the fourth threshold and the fifth threshold to zero.

In other words, when there is a difference in luminance average between smooth blocks of the sky region G122 and the ground region G123, a dirt notification is not made. That is, in a case where a smooth region in the sky region G122 included in the captured image G1 is detected, a smooth region in the ground region G123 included in the captured image G1 is detected, and a difference between a luminance value of the smooth region in the sky region G122 and a luminance value of the smooth region in the ground region G123 is equal to or larger than a sixth threshold, the dirt notification unit 1666 does not notify that dirt adheres to the lens 161 of the in-vehicle camera 16. In this case, for example, a luminance value of a smooth region in the sky region G122 or the ground region G123 is an average luminance value of a corresponding smooth region. Note that a luminance value of a smooth region in the sky region G122 or the ground region G123 is not limited to an average of average luminance values of the respective blocks, and may be an average of largest luminance values of the respective blocks, may be an average of smallest luminance values of the respective blocks, or may be an average of other luminance values.

While certain embodiments have been described, these embodiments have been presented by way of example only, and are not intended to limit the scope of the inventions. Indeed, the novel methods and systems described herein may be embodied in a variety of other forms; moreover, various omissions, substitutions and changes in the form of the methods and systems described herein may be made without departing from the spirit of the inventions. The accompanying claims and their equivalents are intended to cover such forms or modifications as would fall within the scope and spirit of the inventions.

According to an image monitoring device according to the present disclosure, it is possible to prevent false detection of a state in which dirt adheres to a lens of an in-vehicle camera.

What is claimed is:

1. An image monitoring device comprising
a hardware processor connected to a memory, the hardware processor being configured to:
acquire an image of an outside of a vehicle captured by a camera;
make a notification that dirt adheres to a lens of the camera in a case where a ratio of a smooth region in the image is equal to or larger than a threshold, the smooth region being a region in which differences in luminance value between pixels are small; and
make no notification that dirt adheres to the lens of the camera in a case where
a ratio of the smooth region in a sky region is equal to or larger than a threshold, the sky region being a region of a sky included in the image,
a ratio of the smooth region in a ground region is equal to or larger than a threshold, the ground region being a region of a ground surface included in the image, and
a difference between an average of luminance values of the smooth region in the sky region and an average of luminance values of the smooth region in the ground region is equal to or larger than a threshold.

2. The image monitoring device according to claim 1, wherein the hardware processor is configured to make the notification that dirt adheres to the lens of the camera in a case where a ratio of the smooth region in the sky region is smaller than a threshold, or a ratio of the smooth region in the ground region is smaller than a threshold, and a ratio of the smooth region in a combined region of the sky region and the ground region is equal to or larger than a threshold.

3. The image monitoring device according to claim 1, wherein the hardware processor is configured to make no notification that dirt adheres to the lens of the camera in a case where a ratio of the smooth region in the sky region is smaller than a threshold, or a ratio of the smooth region in the ground region is smaller than a threshold, and a ratio of the smooth region in a combined region of the sky region and the ground region is smaller than a threshold.

4. The image monitoring device according to claim 1, wherein the hardware processor is configured to make no notification that dirt adheres to the lens of the camera in a case where a ratio of the smooth region in the sky region, excluding a region where a luminance value is equal to or larger than a threshold, is equal to or larger than a threshold, a ratio of the smooth region in the ground region is equal to or larger than a threshold, and a difference between an average of luminance values of the smooth region in the sky region and an average of luminance values of the smooth region in the ground region is equal to or larger than a threshold.

5. The image monitoring device according to claim 1, wherein the hardware processor is further configured to detect the sky region and the ground region on the basis of a horizon line included in the image captured by the camera.

6. The image monitoring device according to claim 5, wherein the hardware processor performs the detection of the horizon line on the basis of an angle of the camera with respect to a horizontal direction.

7. An image monitoring device comprising a hardware processor connected to a memory, the hardware processor being configured to:

acquire an image of an outside of a vehicle captured by a camera;

make a notification that dirt adheres to a lens of the camera in a case where a ratio of a smooth region in the image is equal to or larger than a threshold, the smooth region being a region in which differences in luminance value between pixels are small; and make no notification that dirt adheres to the lens of the camera in a case where a smooth region in a region of a sky included in the image is detected, a smooth region in a region of a ground surface included in the image is detected, and a difference between a luminance value of a smooth region in the region of the sky and a luminance value of a smooth region in the region of the ground surface is equal to or larger than a threshold.

8. The image monitoring device according to claim 7, wherein a luminance value of a smooth region in the region of the sky or in the region of the ground surface is an average luminance value of a corresponding smooth region.

* * * * *